United States Patent

Baer et al.

[11] 4,208,973
[45] Jun. 24, 1980

[54] SOIL ANTI-CRUSTANT

[75] Inventors: William K. Baer, Glen Ellyn; Nielsen Ralph R., Oak Lawn; Joseph F. Vartiak, Naperville, all of Ill.

[73] Assignee: Nalco Chemical Company, Oakbrook, Ill.

[21] Appl. No.: 2,976

[22] Filed: Jan. 12, 1979

[51] Int. Cl.² .......................... A01G 1/00; A01C 5/06
[52] U.S. Cl. ............................................. 111/1; 47/9; 111/6
[58] Field of Search ....................... 111/1, 6; 47/58, 9, 47/DIG. 10, 1.7

[56] References Cited

U.S. PATENT DOCUMENTS

| | | | |
|---|---|---|---|
| 2,625,529 | 1/1953 | Hedrick et al. | 47/DIG. 10 |
| 2,787,864 | 4/1957 | Eck et al. | 111/6 |
| 2,802,303 | 8/1957 | Weeks | 47/9 |
| 3,094,809 | 6/1963 | Kaufman et al. | 47/9 |
| 3,121,973 | 2/1964 | Phillips et al. | 47/9 |
| 3,261,127 | 7/1966 | Ferm et al. | 47/58 |
| 3,281,987 | 11/1966 | Scott | 47/9 |
| 3,308,578 | 3/1967 | Karcher et al. | 47/9 |
| 3,330,070 | 7/1967 | Ferm et al. | 47/9 |
| 3,475,435 | 10/1969 | Rothfelder | 111/1 |
| 3,653,550 | 4/1972 | Williams | 111/6 X |

Primary Examiner—Robert E. Bagwill
Attorney, Agent, or Firm—Kinzer, Plyer, Dorn & McEachran

[57] ABSTRACT

Reduction of encrustation of a soil where tender crops are germinated by treating the seed bed with an effective amount of a quaternary ammonium cationic polymer, either polydiallyl dimethyl ammonium chloride or a polymer of dimethylamine/epichlorohydrin dissolved in water.

4 Claims, 1 Drawing Figure

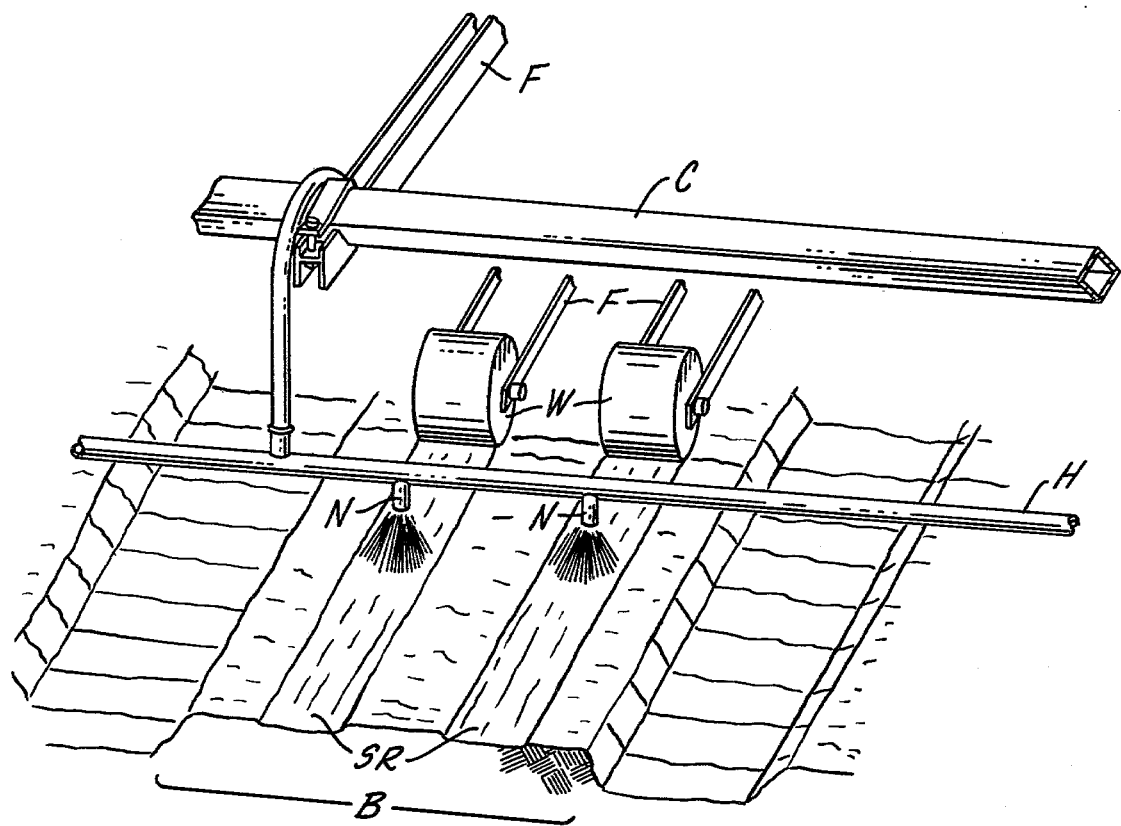

SOIL ANTI-CRUSTANT

This invention relates to soil treatment to aid growth of tender seedlings such as lettuce, tomatoes, broccoli and others.

Naturally occurring polysaccharides in soil are formed in small quantities as the decomposition by-product of plant residue, fertilizers, composts and other organic matter. When the soil has depleted or exhausted its organic matter, it loses porosity and can easily crust over after a rainfall or as a result of sprinkling. Higher air temperatures and increasing wind velocity accelerate soil encrustation.

Soil encrustation decreases the rate of germination and plant vigor, particularly in the instance of tender, frail seedlings not able to push through the crust as easily as hardier plants. Even a moderate improvement in reducing soil encrustation would result in a higher crop yield at considerable economic advantage.

To obtain maximum crop yield, a certain number of plants per row is optimum. In the case of lettuce, for example, it has been established that a plant every nine inches down the row is the optimum for maximum production. In the instance of crusting, the seedling cannot push through the crust and an uneven stem can result even if it breaks through, which means more thinning since the farmer wants even, healthy growth up and down each seed row for all crops.

Among the objects of the present invention are to develop a soil treatment which will reduce soil encrustation, and to enable tender seedlings to germinate and attain vigor more readily. Another object is to supplant a current treatment which involves application of vermiculite, to which many field hands are allergic. Also, the vermiculite is bound to the soil by a separate application of an asphalt which is sticky; special equipment is involved. Another object is to supplant treatment with phosphoric acid, which is corrosive, requiring careful handling and specialized equipment.

The data tabulated hereinafter were obtained from actual field tests at different locations in California, Santa Maria and Salinas for example; there was testing elsewhere, as shown by Table I. The crop at Santa Maria and Salinas was broccoli, the same variety (No. 423) at both locations.

Increased germination was due to a reduction in soil encrustation effected by spraying the seed bed, following planting, with an effective amount of polydiallyl dimethyl chloride in water.

At Santa Maria and Salinas the seeds were planted on raised beds one hundred feet long, spaced by furrows on thirty-eight-inch bed centers. The beds were about sixteen inches wide and two rows of seeds were planted atop each bed. The rows of seeds were separated by about twelve inches.

At Santa Maria, the seeds were two inches apart: theoretical yield, thirty plants per five feet. At Salinas, the seeds were planted two and one-half inches apart: theoretical yield, twenty-four plants per five feet. Many different plots were involved, thirty-four at each location, in fact. The plots were contiguous to one another, in one field at each location.

Of the two rows in each plot, one was sprayed (four-inch spray band) with an anti-encrustant and the adjacent row (unsprayed) was the control.

To obtain a broad count for comparing germination results, the plots were replicated, that is, a row subjected to a particular spray was replicated by applying the same spray (same dosage) to a row in another plot elsewhere in the same field. Of the replicated rows, each had its own adjacent unsprayed row of bedded seeds.

EXAMPLE 1

This spray is a 20% (weight) solution in water of polydiallyl dimethyl ammonium chloride; density 9.09 pounds per gallon and Brookfield viscosity of 205 cp. at 30° F., 37.5 cp. at 130° F.

EXAMPLE 2

This spray is the same as Example 1 except the molecular weight is higher: viscosity 2000 cp. at 24° F., 500 cp. at 100° F.

EXAMPLE 3

This spray is an 81:19 (weight ratio in water) of (A) Example 1 and (B) ethylene oxide-propylene oxide copolymer (80:20). B is a surfactant.

EXAMPLE 4

This spray is an 81:19 (weight ratio in water) mixture of (A) Example 2 and (B) the same surfactant used in Example 3.

After the seeds were planted and the rows sprayed, leaving the adjacent row of each plot as a check or control, plant growth was examined at Santa Maria after an eight-day lapse and again after a sixteen-day lapse; the crop at Salinas was examined twelve days after initial planting and once again nineteen days later.

Germination was counted after each examination, for the two replications and their related control rows. Germination of the entire control crop, for all plots, was counted and averaged and germination in the sprayed rows was also counted and averaged. Results are shown in Tables I and II.

Similar testing of crops was conducted at other times using the composition of Example 1 and the results are also set forth in Tables I and II.

Study of the data exhibited no firm basis for concluding that the high molecular weight spray is superior to the low molecular weight spray, nor does the presence of the surfactant always contribute to better results; the test data for Examples 2, 3 and 4 are therefore not tabulated.

Since a phosphoric acid solution represents a common soil treatment against crust formation, data on that treatment are included in Tables I and II, which now follow.

TABLE I

| Date Location Crop | (1) Plot | Actual Application Conditions | | | | Dosage (3) lbs. active polymer per Sprayed Acre | |
|---|---|---|---|---|---|---|---|
| | | Spray Band " | Bed Size " | Bed # of Rows | Gallons Sprayed (2) Prod. | | |
| 9/20 | Unt. | | | | | | (a) |
| Santa Maria | NX | 4 | 38 | 2 | 27.5 | 50.0 | (b) |
| Broccoli | " | " | " | " | 55.0 | 100.0 | (c) |

TABLE I-continued

Actual Application Conditions

| Date Location Crop | (1) Plot | Spray Band " | Bed Size " | Bed # of Rows | Gallons Sprayed (2) Prod. | Dosage (3) lbs. active polymer per Sprayed Acre | |
|---|---|---|---|---|---|---|---|
| | | " | " | " | 82.5 | 150.0 | (d) |
| 9/27 | Unt. | | | | | | (a) |
| Salinas | Acid | 2 | 40 | 2 | 200.0 | | (b) |
| Broccoli | NX | 4 | " | " | 27.5 | 50.0 | (c) |
| | " | " | " | " | 55.0 | 100.0 | (d) |
| | " | " | " | " | 82.5 | 150.0 | (e) |
| 1/27 | Unt. | | | | | | (a) |
| Salinas | Acid | 2 | 40 | 2 | 350.0 | | (b) |
| Broccoli | NX | 1 | " | " | 22.0 | 40.0 | (c) |
| | " | " | " | " | 33.0 | 60.0 | (d) |
| | " | 4 | " | " | 11.0 | 20.0 | (e) |
| | " | " | " | " | 16.5 | 30.0 | |
| | " | " | " · | " | 22.0 | 40.0 | (g) |
| | " | " | " | " | 27.5 | 50.0 | (h) |
| | " | " | " | " | 33.0 | 60.0 | (i) |
| | " | " | " | " | 11.0 | 20.0 | (j) |
| | " | " | " | " | 16.5 | 30.0 | (k) |
| | " | " | " | " | 22.0 | 40.0 | (l) |
| | " | " | " | " | 27.5 | 50.0 | (m) |
| | " | " | " | " | 33.0 | 60.0 | (n) |
| 3/15 | Unt. | | | | | | (a) |
| Salinas | Acid | 2 | 40 | 2 | 300.0 | | (b) |
| Lettuce | NX | " | " | " | 5.5 | 10.0 | (c) |
| | " | " | " | " | 11.0 | 20.0 | (d) |
| | " | " | " | " | 16.5 | 30.0 | (e) |
| | " | " | " | " | 22.0 | 40.0 | (f) |
| | " | " | " | " | 27.5 | 50.0 | (g) |
| | " | " | " | " | 55.0 | 100.0 | (h) |
| 4/12 | Unt. | | | | | | (a) |
| Woodland | Acid | 2 | 60 | 1 | 450.0 | | (b) |
| Tomatoes | NX | " | " | " | 16.5 | 30.0 | (c) |
| | " | " | " | " | 33.0 | 60.0 | (d) |
| | " | " | " | " | 49.5 | 90.0 | (e) |
| | " | " | " | " | 66.0 | 120.0 | (f) |
| | " | " | " | " | 82.5 | 150.0 | (g) |
| 3/29 | Unt. | | | | | | (a) |
| Guadalupe | NX | 24 | 38 | 2 | 20.0 | 36.4 | (b) |
| Lettuce | " | " | " | 41 | 40.0 | 72.7 | (c) |
| 4/05 | Unt. | | | | | | (a) |
| Dixon | Acid | 2 | 60 | 1 | 600.0 | | (b) |
| Tomatoes | NX | " | " | " | 60.0 | 110.0 | (c) |
| 4/19 | Unt. | | | | | | (a) |
| Gonzales | Asph/Ver. | ? | 40 | 2 | | | (b) |
| Lettuce | NX | 5 | " | " | 32.0 | 58.0 | (c) |

FOOTNOTES TO TABLE I
(1)Unt. = Untreated; Acid = H$_3$PO$_4$ 30–40%; NX = Example 1; Asph/Ver. = Asphalt at 50 gal./field acre plus vermiculite at 5 cu. yds./field acre.
(2)Dosage baed upon spraying the whole acre (sprayed acre) with Example 1 solution.
(3)Dosage based on pounds of active polymer per sprayed acre.

TABLE II

Evaluation of % Emergence

| Item | Days after Applied | (4) Feet of row Counted | Avg. Plants per 5 ft. | (5) % Emerged | % Diff. Vs. Avg. Unt. | % Diff. Vs. Avg. Acid |
|---|---|---|---|---|---|---|
| (a) | 8 & 16 | 340 | 19.0 | 63 | | |
| (b) | " | 320 | 22.8 | 76 | +21 | |
| (c) | " | " | 20.8 | 69 | +10 | |
| (d) | " | " | 24.2 | 81 | +29 | |
| (a) | 12 & 19 | 340 | 12.1 | 51 | | |
| (b) | " | 320 | 14.8 | 62 | +22 | |
| (c) | " | " | 17.5 | 73 | +43 | +18 |
| (d) | " | " | 19.2 | 80 | +57 | +29 |
| (e) | " | " | 18.0 | 75 | +47 | +21 |
| (a) | 33 | 1000 | 13.9 | 58 | | |
| (b) | " | 1320 | 12.9 | 54 | −7 | |
| (c) | " | 1360 | 14.6 | 61 | +5 | +13 |
| (d) | " | " | 14.4 | 60 | +4 | +12 |
| (e) | " | " | 15.3 | 64 | +10 | +19 |
| (f) | " | " | 15.1 | 63 | +8 | +17 |
| (g) | " | " | 14.5 | 60 | +4 | +12 |
| (h) | " | " | 13.9 | 58 | 0 | +8 |
| (i) | " | " | 13.6 | 57 | −3 | +5 |
| (j) | " | " | 14.2 | 59 | +2 | +10 |
| (k) | " | " | 15.8 | 66 | +12 | +22 |
| (l) | " | " | 15.7 | 65 | +13 | +22 |
| (m) | " | " | 13.4 | 56 | −4 | +4 |
| (n) | " | " | 15.6 | 65 | +13 | +22 |
| (a) | 26 | 2200 | 17.7 | 75 | | |
| (b) | " | 3300 | 18.6 | 78 | +4 | |
| (c) | " | 3300 | 20.5 | 86 | +15 | +10 |
| (d) | " | " | 21.0 | 87 | +17 | +12 |
| (e) | " | " | 21.0 | 87 | +17 | +12 |
| (f) | " | " | 20.8 | 87 | +17 | +12 |
| (g) | " | " | 22.0 | 92 | +23 | +18 |
| (h) | " | " | 21.6 | 90 | +21 | +16 |
| (a) | 21 | 810 | 31.6 | 39 | | |
| (b) | " | 270 | 40.0 | 50 | +27 | |
| (c) | " | 135 | 41.8 | 52 | +32 | +4 |
| (d) | " | " | 44.2 | 55 | +40 | +10 |
| (e) | " | " | 39.5 | 49 | +25 | −1 |

TABLE II-continued

| | | Evaluation of % Emergence | | | | |
|---|---|---|---|---|---|---|
| | Days after Applied | (4) Feet of row Counted | Avg. Plants per 5 ft. | (5) % Emerged | % Diff. Vs. Avg. Unt. | % Diff. Vs. Avg. Acid |
| (f) | " | " | 45.5 | 56 | +44 | +14 |
| (g) | " | " | 46.3 | 57 | +46 | +16 |
| (a) | 15 | 80 | 10.7 | 45 | | |
| (b) | " | 40 | 22.9 | 95 | +114 | |
| (c) | " | 40 | 20.5 | 85 | +92 | |
| (a) | ? | 20 | 24.0 | 30 | | |
| (b) | " | " | 52.0 | 64 | +117 | |
| (c) | " | " | 51.0 | 63 | +112 | −2 |
| (a) | 14 | 20 | 12.0 | 50 | | |
| (b) | " | " | 19.5 | 62 | +62 | |
| (c) | " | " | 19.5 | 81 | +62 | |

FOOTNOTES TO TABLE II
(4) Number of feet of seed row counted for the recorded figure. For the plots of 9/20 and 9/27, the 20 feet includes 2 replicates and 2 dates.
(5) Percent emergence is based on the following assumptions: 9/20 Broccoli 30 seeds/5 ft; all other broccoli and lettuce 24 seeds/5 ft; tomatoes 80–81 seeds/5 ft.

A sprayed acre dosage defines the amount of material used if an actual entire acre (43,560 ft.$^2$) was treated. A grower can then calculate how much to be applied on a more economical basis per "field acre" depending on how and what he is planting. The calculation is as follows:

Dosage/field acre = Dosage/sprayed acre × $\frac{\text{Spray band inches} \times \text{Seed rows/bed}}{\text{Inches between bed centers}}$ The preferred solution, Example 1, has a density of 9.09 lbs./gallon and is 20% by weight of active polymer. The dosage in gallons of treatment solution or product per sprayed acre can, therefore, be converted to lbs. active/sprayed acre as follows:

Lbs. active/sprayed acre = gal./sprayed acre × 9.09 lbs./gal. × 0.2

The spray of Example 1 was field tested on a Texas pepper farm in the Rio Grande Valley, employing ten different treatments: one treatment was fed at the rate of 34.5 lbs. active polymer per sprayed acre, the other at 51.8 lbs. The crop was examined seventeen days later and compared to the untreated control crop. The results were, respectively, +37% and +25% emergence compared to the control.

Polydiallyl dimethyl ammonium chloride is a quaternary ammonium cationic polymer. Another quaternary ammonium cationic polymer exhibiting anticrustant performance in accordance with the present invention is a polymer of dimethylamine/epichlorohydrin.

EXAMPLE 5

This spray is in 47% (by weight) solution of a dimethylamine/epichlorohydrin polymer in water: intrinsic viscosity 0.15/0.17, mol.wt. 15000/20000. The spray was tested as an anticrustant under actual field conditions with the results shown in Tables III and IV.

TABLE III

| Date Location Crop | Product lbs./ Field Acre | lbs. Active/ Sprayed Acre | Avg. % Emergence* (two 50 ft. counts) | | | |
|---|---|---|---|---|---|---|
| | | | Unt. | Ex. 5 | Acid | |
| 3/15 Salinas | 15 | 71 | 64.4 | 78.7 | 76.2 | (a) |
| | 25 | 119 | 86.2 | 99.4 | 76.5 | (b) |
| Lettuce | 35 | 166 | 70.0 | 84.2 | 76.5 | (c) |

FOOTNOTES: TABLES III
(1) vs. adjacent untreated rows on South side of bed.
(2) vs. acid rows on North side of middle beds in adjacent acid plot.
(3) vs. average of all untreated counts 82200 ft. counted).
(4) vs. balanced average of all acid counts (4400 ft. counted); 77.8% Emergence.
*Evaluated 4/10 after 26 days. Dosages on a 2" band (2 rows/40" bed). All acid treatment equal to 30GPA, 28% phosphoric acid.

TABLE IV

| | Rel. % Difference of Ex. 5 VS | | | |
|---|---|---|---|---|
| | Adjacent Untreated (Adj. Unt.) (1) | Adj. Acid (2) | Avg. Unt. (3) | Avg. Acid (4) |
| (a) | +22 | +3 | +5 | +1 |
| (b) | +15 | +30 | +33 | +28 |
| (c) | +20 | +10 | +13 | +8 |
| Average | +19 | +14 | +17 | +12 |

FOOTNOTES: TABLES IV
(1) vs. adjacent untreated rows on South side of bed.
(2) vs. acid rows on North side of middle beds in adjacent acid plot.
(3) vs. average of all untreated counts 82200 ft. counted).
(4) vs. balanced average of all acid counts (4400 ft. counted); 77.8% Emergence.
*Evaluated 4/10 affter 26 days. Dosages on a 2" band (2 rows/40" bed). All acid treatment equal to 30GPA, 28% phosphoric acid.

The soil treatments of Examples 1 and 5 represent eliminations determined by extensive laboratory as well as field screening over a protracted period of time. Laboratory screening was accomplished by simulating field conditions. Most planting of tender plant seeds is accompanied by lightly pressing the soil of the seed row by means of press wheel. The procedure is easily simulated in the laboratory, using the local soil.

The soil selected for testing was obtained from Los Banos, California. It displays a tendency to form a hard crust after watering and hence is easily replicated. A large batch of the soil may then be separated into uniform samples, the samples pressed down to simulate the planting condition and then treated with various soil anticrustant candidates on an equivalent basis.

The next step is to air dry each sample on a uniform basis, apply an equal amount of water to the samples of each soil sample, subject each sample to an identical forced air oven dry treatment, and then allow the sample to stand until room temperature is reached.

The sample is then ready to be measured for crust strength. A superior anticrustant chemical will be evidenced by a weaker crust.

Six replications were made for treated and untreated (control) soil samples and four readings were taken for each sample; averages were calculated.

The device used to measure crust strength was a Chatillon Tension and Compression Tester, Model LTC, Dial Model DPP equipped with a cone head for penetrating the soil under a given load; the dial reading can be converted to inches penetration.

The data are set forth in Table V. The soil samples each weighed forty grams, simulating (in the pan or dish) one-half inch of topsoil as a typical seed depth. Each treatment was a water solution containing 0.5% by weight of the active chemical.

TABLE V

| Chemical | Ml. Per Pan | lbs./ Sprayed Acre | Soil Penetration Inches | % Rel. Diff. in Penetration Vs 1 |
|---|---|---|---|---|
| Control (no chemical) | — | — | 0.026 | −83 |
| Ex. 1 | 1.79 | 31 | 0.151 | — |
|  | 3.56 | 62 | 0.154 | + 2 |
| Ex. 5 | 1.79 | 31 | 0.120 | −20 |
|  | 3.56 | 62 | 0.145 | − 4 |
| Polyacrylonitrile | 1.79 | 31 | 0.026 | −83 |
| (hydroxlyzed, low mol. | 2.65 | 46 | 0.057 | −62 |
| wt.) | 3.56 | 62 | 0.088 | −42 |
| Polyacrylamide/sodium | 1.79 | 31 | 0.088 | −42 |
| polyacrylate (70:30; | 2.65 | 46 | 0.088 | −42 |
| high mol.wt.) | 3.56 | 62 | 0.057 | −62 |
| Polyacrylamide | 1.79 | 31 | 0.062 | −59 |
| (high mol. wt.) | 2.65 | 46 | 0.062 | −59 |
|  | 3.56 | 62 | 0.062 | −59 |
| Polyacrylamide | 1.79 | 31 | 0.057 | −62 |
| (low mol. wt.) | 2.65 | 46 | 0.088 | −42 |
|  | 3.56 | 62 | 0.088 | −42 |
| DMAEM quat.copolymer | 1.79 | 31 | 0.057 | −62 |
| (1) | 2.65 | 46 | 0.057 | −62 |
|  | 3.56 | 62 | 0.057 | −62 |
| DMAEM copolymer (2) | 1.79 | 31 | 0.057 | −62 |
|  | 2.65 | 46 | 0.057 | −62 |
|  | 3.56 | 62 | 0.057 | −62 |
| Sodium polyacrylate | 1.79 | 31 | 0.026 | −83 |
|  | 2.65 | 46 | 0.026 | −83 |
|  | 3.57 | 62 | 0.057 | −62 |
| Sodium acrylate/methyl | 1.79 | 31 | 0.062 | −59 |
| acrylate copolymer (3) | 2.65 | 46 | 0.026 | −83 |
|  | 3.56 | 62 | 0.026 | −83 |
| MAPTAC (4) | 1.79 | 31 | 0.088 | −42 |
|  | 2.65 | 46 | 0.120 | −20 |
|  | 3.56 | 62 | 0.120 | −20 |

FOOTNOTES TO TABLE V
(1)42% dimethyl amino ethyl methacrylate (quaternized), 58% acrylamide copolymer.
(2)25% dimethyl amino ethylmethacrylate, 75% acrylamide copolymer; not quaternized.
(3)75% sodium acrylate, 25% methyl acrylate copolymer.
(4) 60% methylacrylamide propyl trimethyl ammonium chloride, 40% acrylamide copolymer The last column in Table V is the significant one, showing relative difference in penetration vs. Example 1. For example, −83 for the control signifies 83% less penetration (stronger crust) for an untreated soil compared to the same soil sample treated with the polymer which features in Example 1. The next best treatment is the chemical of Example 5, where the two measurements respectively showed 20% and 4% less penetration compared to the chemical of Example 1.

The effective examples embrace cationic quaternary ammonium compounds. The only other chemical in Table V falling into that category is the footnote (1) compound which is both quaternary and cationic; the remaining chemicals, other than Example 1, Example 5, footnote (1) and footnote (2), are anionic.

In addition to the screening represented by Table V, a host of treatments were screened out on a qualitative basis as not being worthy of quantitative testing as an anti-crustant: gypsum, quar gum, gum Arabic, calcium lignosulfate, polyethoxylated fatty acids, ionic and non-ionic surfactants (TWEEN 80, TRITON and the PLURONIC L-60 series), magnesium nitrate, magnesium chloride, mono-potassium phosphate (and nitrate), potassium sulfate, calcium phosphate, activated charcoal, numerous chelates and the following acids; citric, tartaric, oxalic, gluconic, sulfuric, hydrochloric and nitric.

The drawing shows a typical field treatment. The planter equipment is tractor-towed. Wide beds B are formed and, in the instance shown, two seed rows SR are furrowed atop each bed. The seeds are dropped progressively in each row as the equipment progresses across the field. The seeds are automatically covered with loose soil which is pressed down by presser wheels W supported by and beneath a frame F. The anticrustant (either Example 1 or 5) is sprayed from nozzles N, supplied by a tank on the trailer, following the presser wheels. The nozzles N communicate with a header H in turn supported by a cross bar C attached to frame F.

The invention in practice may also be applied to seed beds of lettuce, carrots, tomatoes, brussel sprouts, cauliflower, onions, sugar beets, peppers, celery, cabbage, and cotton. The texture of the soil and ambient conditions over a wide geographic range could make a difference and consequently actual practice may vary.

The general dosage range for Examples 1 and 2 is 10 to 100 pounds active/sprayed acre, with the preferred dosage being 30 to 50 pounds active/sprayed acre. The dosage range for Example 5 is probably slightly higher based on available data. These dosages are based on consideration of all available data.

When the invention in practice is applied to a soil of encrustation potential, the anticipated weather conditions (rainfall, temperature, and wind) become important in determining the applied dosage. If, for example, a grower should expect severe weather after planting, an Example 1 dosage of 50 or more pounds active per sprayed acre would be desirable.

We claim:
1. A method of reducing soil encrustation in a seed bed by spraying the seed bed, after planting the seeds, with an effective amount of (a) polydiallyl dimethyl ammonium chloride or (b) a polymer of dimethylamine/epichlorophydrin dissolved in water.
2. A method according to claim 1 in which the spray is applied by a nozzle carried on a frame towed by a tractor, the nozzle being in trailing position behind a presser wheel which compacts soil covering the seeds prior to the application of the spray.

3. A method according to claim 1 or 2 in which the effective amount of either (a) or (b) is at least about 10 pounds per sprayed acre.

4. A method according to claim 3 in which the crop is a tender plant selected from the group consisting of lettuce, carrots, tomatoes, brussel sprouts, cauliflower, onions, sugar beets, broccoli, celery, peppers, cabbage and cotton.

* * * * *

UNITED STATES PATENT OFFICE
CERTIFICATE OF CORRECTION

Patent No. 4,208,973  Dated June 24, 1980

Inventor(s) WILLIAM K. BAER, RALPH R. NIELSEN & JOSEPH F. VARTIAK

It is certified that error appears in the above-identified patent and that said Letters Patent are hereby corrected as shown below:

A. Inventors: William K. Baer, Glen Ellyn; [Nielsen Ralph R.], Oak Lawn; Joseph F. Vartiak, Naperville, all of Ill.

"Letters Patent should read as:"

A. Inventors: William K. Baer, Glen Ellyn; Ralph R. Nielsen, Oak Lawn; Joseph F. Vartiak, Naperville, all of Ill.

Signed and Sealed this

Second Day of September 1980

[SEAL]

Attest:

SIDNEY A. DIAMOND

Attesting Officer

Commissioner of Patents and Trademarks